United States Patent [19]

Pottick et al.

[11] Patent Number: 4,868,245
[45] Date of Patent: Sep. 19, 1989

[54] MODIFIED BLOCK COPOLYMERS HAVING CARBOXYL GROUPS GRAFTED ON THE ALKENYL ARENE BLOCKS

[75] Inventors: Lorelle Pottick; Carl L. Willis; William P. Gergen, all of Houston; Robert G. Lutz, Spring, all of Tex.

[73] Assignee: Shell Oil Company, Houston, Tex.

[21] Appl. No.: 79,380

[22] Filed: Jul. 30, 1987

Related U.S. Application Data

[63] Continuation-in-part of Ser. No. 766,217, Aug. 16, 1985.

[51] Int. Cl.$^4$ .................. C08L 53/02; C08L 25/06
[52] U.S. Cl. .................................. 525/98; 525/366; 525/314; 525/366; 525/370; 525/383; 525/386
[58] Field of Search ............ 525/370, 98, 314, 386, 525/383

[56] References Cited

U.S. PATENT DOCUMENTS

| | | |
|---|---|---|
| 3,598,887 | 8/1971 | Darcy et al. .................. 525/271 |
| 3,976,628 | 8/1976 | Halasa et al. .................. 525/250 |
| 4,145,298 | 3/1979 | Trepka .......................... 252/51.5 |
| 4,145,490 | 3/1979 | Harris et al. .................. 525/366 |
| 4,409,357 | 10/1983 | Milkovich ..................... 524/505 |
| 4,471,099 | 9/1984 | Trepka .......................... 525/366 |
| 4,578,429 | 3/1986 | Gergen et al. ................. 525/291 |
| 4,628,072 | 12/1986 | Shiraki et al. ................. 525/57 |
| 4,657,970 | 4/1987 | Shiraki et al. ................. 525/98 |

*Primary Examiner*—Wilbert J. Briggs, Sr.

[57] ABSTRACT

A thermoplastic polymer and an article of manufacture consisting essentially of this polymer are described herein which possess excellent mechanical properties at both room and elevated temperatures. The polymer is obtained by modifying a block copolymer composed of a conjugated diene compound and an alkenyl arene compound. The block copolymer is first selectively hydrogenated and thereafter modified by grafting carboxyl containing functional groups primarily in the alkenyl arene block via metalation. The mechanical properties may be varied and controlled by varying the degree of functionalization (amount of carboxyl groups), and the degree of neutralization of the carboxyl groups from an acid to a metal carboxylate salt.

42 Claims, 1 Drawing Sheet

MODIFIED BLOCK COPOLYMERS HAVING CARBOXYL GROUPS GRAFTED ON THE ALKENYL ARENE BLOCKS

CROSS-REFERENCE TO RELATED APPLICATIONS

This is a continuation-in-part of U.S. patent application Ser. No. 766,217, filed Aug. 16, 1985.

FIELD OF THE INVENTION

This invention relates to novel selectively hydrogenated functionalized block copolymers. More particularly, it relates to a novel thermoplastic polymer with excellent mechanical properties at both room and elevated temperatures and articles of manufacture consisting essentially of same. The polymer is obtained by modifying a block copolymer composed of a conjugated diene compound and an alkenyl arene compound with a carboxyl containing functional group grafted primarily in the alkenyl arene block followed by neutralization with a metal ion.

BACKGROUND OF THE INVENTION

It is known that a block copolymer can be obtained by an anionic copolymerization of a conjugated diene compound and an alkenyl arene compound by using an organic alkali metal initiator. Block copolymers have been produced, see U.S. Patent Re 27,145 which comprise primarily those having a general structure

A—B—A wherein the two terminal polymer blocks A comprise thermoplastic polymer blocks of alkenyl arenes such as polystyrene, while block B is a polymer block of a selectively hydrogenated conjugated diene. The proportion of the thermoplastic terminal blocks to the center elastomeric polymer block and the relative molecular weights of each of these blocks is balanced to obtain a rubber having an optimum combination of properties such that it behaves as a vulcanized rubber without requiring the actual step of vulcanization. Moreover, these block copolymers may be designed not only with this important advantage but also so as to be handled in thermoplastic forming equipment and are soluble in a variety of relatively low cost solvents.

These types of block copolymers are diversified in characteristics, depending on the content of the alkenyl arene compound. When the content of the alkenyl arene compound is small, the produced block copolymer is a so-called thermoplastic rubber. It is a very useful polymer which shows rubber elasticity in the unvulcanized state and is applicable for various uses such as moldings of shoe sole, etc.; impact modifier for polystyrene resins and engineering thermoplastics; in adhesive and binder formulations; modification of asphalt; etc.

The block copolymers with a high alkenyl arene compound content, such as more than 70% by weight, provide a resin possessing both excellent impact resistance and transparency, and such a resin is widely used in the field of packaging. Many proposals have been made on processes for the preparation of these types of block copolymers (U.S. 3,639,517).

While in general these block copolymers have a number of outstanding technical advantages, one of their principal limitations lies in their sensitivity to oxidation. This behavior is due to the unsaturation present in the center section comprising the polymeric diene block. Oxidation may be minimized by selectively hydrogenating the copolymer in the diene block, for example, as disclosed in U.S. Patent Re 27,145. Prior to hydrogenation, the block copolymers have an A-B-A molecular structure wherein each of the A's is an alkenyl-arene polymer block and B is a conjugated diene polymer block, preferably a butadiene polymer block containing 35–55 mole percent of the condensed butadiene units in a 1,2 configuration.

These selectively hydrogenated ABA block copolymers are deficient in many applications in which the retention of properties at elevated temperatures and deformation resistance are required. At relatively low temperatures, say room temperature, these copolymers are known to have particularly high tensile strengths due to the formation of glassy phase arene block domains which act as physical entanglements within the rubbery B block matrix. The mechanical integrity of these domains appears to control the tensile strengths of these copolymers. Moreover, at elevated temperatures, the mechanical integrity of block copolymers are limited to the integrity of the hard phase arene block domains. For example, copolymers having arene blocks of polystyrene have poor mechanical properties at high temperature which may be attributed to the weakening of the polystyrene domains above its glass transition temperature (Tg) of 100° C. Improvements in the high temperature characteristics of these block copolymers may be achieved by enhancing the integrity of the alkenyl arene domains to higher temperatures.

These selectively hydrogenated, hydrocarbon ABA block copolymers are further deficient in many applications in which interactions are required between it and other materials. Applications in which improvements in adhesion characteristics may promote improved performance include (1) the toughening of, and dispersion in, polar polymers such as the engineering thermoplastics; (2) the adhesion to high energy substrates in a hydrogenated block copolymer elastomer based high temperature adhesive, sealant or coating; and (3) the use of hydrogenated elastomers in reinforced polymer systems. The placement of functional groups onto the block copolymer may provide interactions not possible with hydrocarbon polymers and, hence, may extend the range of applicability of this material.

Many attempts have been made to improve adhesive characteristics, green strength and other properties by modifying block copolymers with acid compounds. To this end, various methods have been proposed for modifying the polymer with acid moieties, for example, Saito et al. in U.S. Pat. Nos. 4,292,414 and 4,308,353; Hergenrother et al. in U.S. Pat. No. 4,427,828; and Gergen et al. in U.S. Pat. No. 4,578,429. In each case, such modified block copolymers contain functional (acid) moieties only in the diene block. Specifically, Saito et al. and Hergenrother et al. attach anhydride moieties to a partially hydrogenated monovinyl arene/conjugated diene block copolymer by the so-called "ENE" reaction. Gergen et al. describe a block copolymer which is a thermally stable, selectively hydrogenated, high 1,2 content substituted vinyl arene/conjugated diene block copolymer grafted with at least one functional (anhydride) moiety at a secondary or tertiary carbon position via a free radical initiated reaction.

However, such modified block copolymers do not take advantage of the arene block domain phenomena.

Furthermore, the elastomeric properties of the polymer may be adversely altered by modifying or functionalizing the polymer B block. Thus, focusing on improving the high temperature capabilities of the block copolymer, such properties may be obtained by increasing the arene A block glass transition temperature (Tg), and by extending the mechanical integrity of the arene A block domains to higher temperatures. These performance characteristics are to be accomplished without substantially modifying the elastomeric B blocks which are molecularly attached to the arene A block domains. Therefore, it is necessary that the functional groups be grafted primarily in the arene block, A, such as is disclosed in copending U.S. patent application Ser. No. 766,217.

Focusing on block copolymer compositions containing carboxyl functional groups in the arene block, research and experimentation have yielded unexpected and significant high temperature mechanical performance improvements. The high temperature properties are improved by having the carboxyl functional groups present in an all acid form, in a combination of their acid and neutralized metal carboxylate salt forms, or in an all neutralized metal carboxylate salt. Furthermore, the high temperature properties are also improved by increasing the degree of carboxyl functionality and/or by utilizing metal ions of increasing ionized valence states.

The neutralization effect described herein is to promote ion pair interactions (ionic crosslinking) which results in the improved mechanical performance. However, the ionic crosslinking herein is to be distinguished from that disclosed in Rees, U.S. Pat. No. 3,264,272; Saito et al., U.S. Pat. No. 4,429,076; and Gergen et al., U.S. Pat. No. 4,578,429. In all three inventions, the location of functionality and hence ionic crosslinking occurs in an elastomeric conjugated diene block rather than an arene block. Saito et al. ultilizes ionic crosslinking to improve the impact resistance and hardness of blends of a modified block copolymer and a thermoplastic polymer having a polar group. On the other hand, Rees is limited to ionic crosslinking in homopolymer systems in which the carboxyl groups are distributed throughout the homopolymer molecule. Rees does not deal with copolymers and resulting domain formation. Furthermore, Rees limits the degree of neutralization from 10 to 90 percent. Herein, the greatest improvement in performance is achieved with neutralization levels greater than 90 percent of total carboxyl functionality.

SUMMARY OF THE INVENTION

According to the present invention, there is provided a thermally stable, selectively hydrogenated, high 1,2 content to which a carboxyl functional group has been grafted primarily in the alkenyl arene block and an article of manufacture consisting essentially of this. Each of the alkenyl arene block domains are preferably ionically crosslinked within the separate domain by neutralizing from 0 percent to 100 percent, preferably from about 5 percent to about 100 percent, more preferably at least 50 percent, and most preferably at least 90 percent, of the carboxyl functional groups therein with metal ions of any positive valence, preferably mono-, di- or trivalent metal ions.

More specifically, there is provided a functionalized selectively hydrogenated block copolymer to which has been grafted a carboxyl functional group and an article of manufacture consisting essentially of this block copolymer. The copolymer has (a) at least two alkenyl arene polymer A blocks and (b) at least one substantially completely hydrogenated conjugated diene B block which is molecularly attached to and between two A blocks, (c) wherein substantially all of the carboxyl functional groups are grafted to the copolymer in the A blocks and (d) 0 percent to 100 percent of the carboxyl functional groups are ionized with metal ions having a positive ionized valence state, preferably of from one to three inclusive, and are selected from the group consisting of uncomplexed and complexed metal ions. The grafted carboxyl functional group is preferably present at between about an average of one carboxyl functional group per A block and about an average of one carboxyl functional group per aromatic ring of the A block. These grafted carboxyl functional groups may be in an all acid form (—COOH) which corresponds to 100 percent neutralization, or in a combination of their acid and metal carboxylate salt forms which corresponds to a partially neutralized state. The grafted carboxyl functional groups are preferably neutralized with metal ions where the degree of neutralization ranges preferably from about 5 percent to 100 percent, more preferably at least 50 percent, and most preferably at least 90 percent, of the grafted carboxyl functional groups. Furthermore, the copolymer may be linear or branched, with the term "branched" also including symmetric or asymmetric radial and star structures.

Preferably, there is provided the functionalized selectively hydrogenated block copolymer and the article of manufacture as defined above, wherein (a) each of the A blocks prior to hydrogenation is predominantly a polymerized monoalkenyl monocyclic arene block having an average molecular weight of about 1,000 to about 115,000, (b) each of the B blocks prior to hydrogenation is predominantly a polymerized conjugated diene block having an average molecular weight of about 10,000 to about 450,000, (c) the A blocks constitute about 1 to about 99 percent by weight of the copolymer, (d) the unsaturation of the B blocks is less than about 10 percent of the original unsaturation of the B blocks, (e) the unsaturation of the A blocks is greater than about 50 percent of the original unsaturation of the A blocks, and (f) the carboxyl functional group is preferably present at between about 0.06 percent to about 45.0 percent, more preferably about 0.5 percent to about 15.0 percent, by weight of the monoalkenyl monocyclic arene content of the block copolymer prior to hydrogenation and functionalization.

The feature of this invention lies in providing modified block copolymers which are thermally stable; have a low residual unsaturation; are processable in solution and/or in the melt; have excellent mechanical properties especially at elevated temperatures, such as tensile strength and, deformation resistance; etc. The article of manufacture consisting essentially of this modified block copolymer also possesses these excellent mechanical properties.

Accordingly, those and other features and advantages of the present invention will become apparent from the following detailed description, wherein reference is made to the figures in the accompanying drawings.

IN THE DRAWING

FIG. 1 is a graphical depiction of the relationship between the dynamic tensile moduli "E" of the modified block copolymers of the present invention and of the unmodified block copolymer versus temperature.

DETAILED DESCRIPTION OF THE INVENTION

Selectively Hydrogenated Block Copolymer Base Polymer

Figure 1:
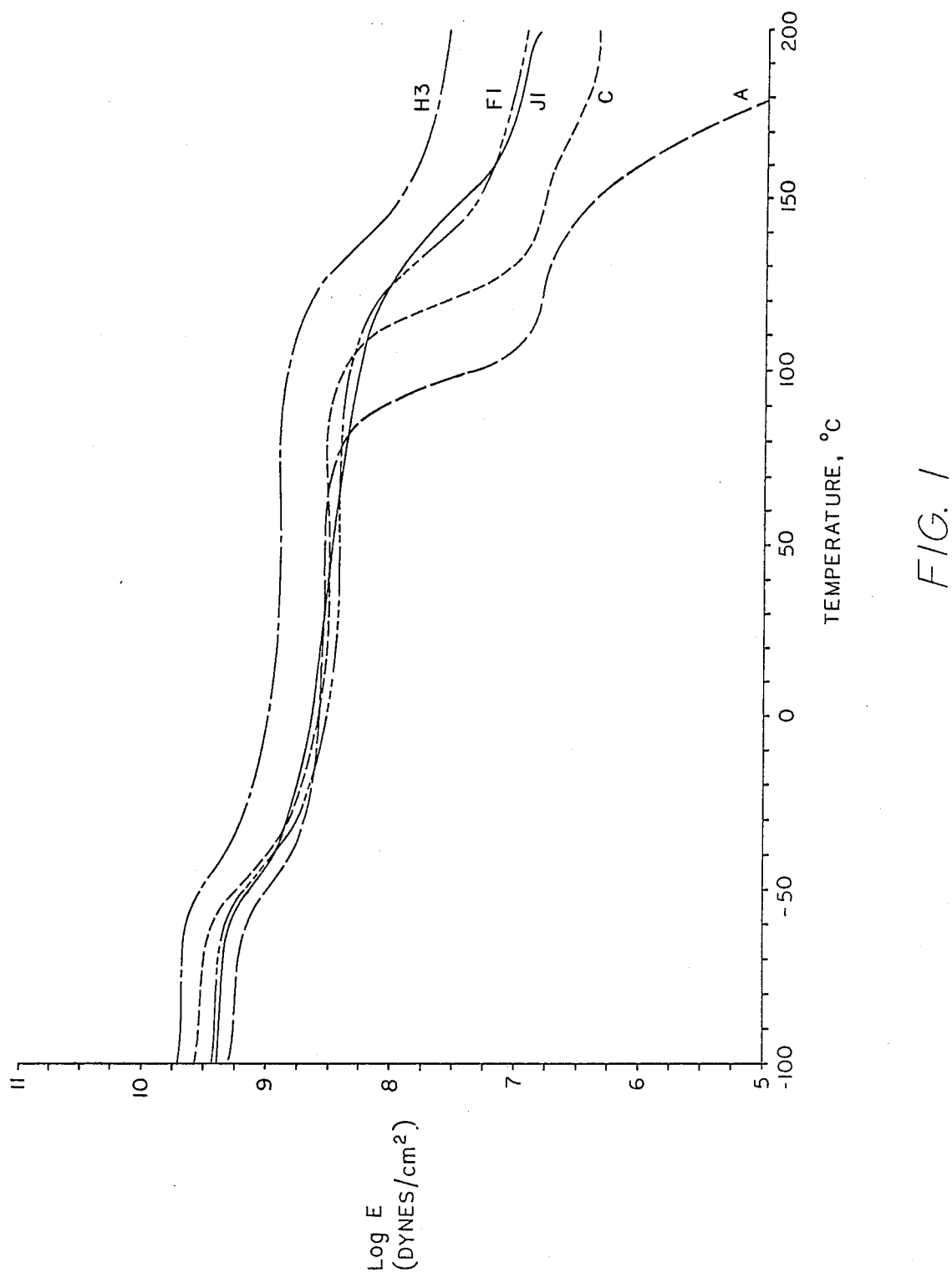

The block copolymers employed herein may have a variety of geometrical structures, since the invention does not depend on any specific geometrical structure, but rather upon the chemical constitution of each of the polymer blocks and of the coupling agents utilized. The block copolymers employed in the present composition are thermoplastic elastomers and have at least two alkenyl arene polymer end blocks A and at least one elastomeric conjugated diene polymer mid block B. The number of blocks in the block copolymer is not of special importance and the macromolecular configuration may be linear or branched, which includes graft, radial or star configurations, depending upon the method by which the block copolymer is formed. The radial or star configuration may be either symmetric or asymmetric. Typical block copolymers of the most simple configuration would have the structure polystyrene-polybutadiene-polystyrene (S-B-S) and polystyrene-polyisoprene-polystyrene (S-I-S). A typical radial or star polymer would comprise one in which the diene block has three or four branches (radial) or five or more branches (star), the tip of some (asymmetric) or each (symmetric) branch being connected to a polystyrene block.

It will be understood that both blocks A and B may be either homopolymer, random or tapered copolymer blocks as long as each block predominates in at least one class of the monomers characterizing the blocks defined herein before. Thus, blocks A may comprise styrene/alpha-methylstyrene copolymer blocks or styrene/butadiene random or tapered copolymer blocks as long as the blocks individually predominate in alkenyl arenes. The A blocks are preferably monoalkenyl arene. The term "monoalkenyl arene" will be taken to include particularly those of the benzene series such as styrene and its analogs and homologs including alpha-methylstyrene and ring alkylated styrenes, particularly ring-methylated styrenes, and other monoalkenyl polycyclic aromatic compounds such as vinyl naphthalene and the like. The preferred monoalkenyl arenes are styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

Preferably, the block copolymers of conjugated dienes and alkenyl arenes which may be utilized include any of those materials which have 1,2-microstructure contents prior to hydrogenation of from about 7% to about 100%. Such block copolymers may contain various ratios of conjugated dienes to alkenyl arenes. The proportion of the alkenyl arene blocks is between about 1 and about 99 percent by weight of the multiblock copolymer. To exhibit elastomeric properties, the proportion of the alkenyl arene blocks in these block copolymers is between preferably about 2 and about 65 percent, and more preferably between about 5 and about 40 percent by weight.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. The total average molecular weight of the multiblock copolymer is typically in the order of about 14,000 to about 350,000, preferably from about 14,000 to about 270,000. These molecular weights are most accurately determined by gel permeation chromatography.

The block copolymer may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multi-block copolymers containing tapered copolymer blocks including U.S. Pat. Nos. 3,251,905; 3,265,765; 3,639,521 and 4,208,356 the disclosures of which are incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953; the disclosure of which patents are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are preferably hydrogenated to increase their thermal stability and resistance to oxidation. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

Modified Block Copolymers

The modified block copolymers according to the present invention are grafted or substituted in the alkenyl arene block by the metalation process as described in copending U.S. patent application Ser. No. 766,622 (K4723) which is incorporated herein by reference. Exemplary reactions are given below:

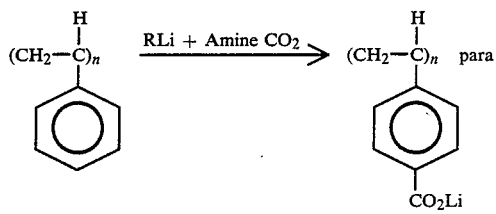

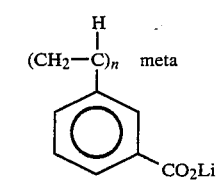

Where: RLi = Alkyl Lithium

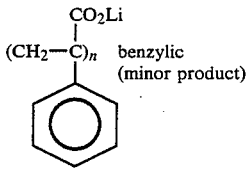

The structure of the substituted block copolymer specifically determined by the location of the functionality on the alkenyl arene block gives the block copolymer a substantially greater degree of thermal stability.

Graftable Compounds

In general, any materials having the ability to react with the metalated base polymer, are operable for the purposes of this invention.

In order to incorporate functional groups into the metalated base polymer, electrophiles capable of reacting with the metalated base polymer are necessary. Reactants may be polymerizable or nonpolymerizable; however, preferred electrophiles are nonpolymerizable or slowly polymerizing.

The class of preferred electrophiles which will form graft polymers within the scope of the present invention include reactants from the following groups carbon dioxide, ethylene oxide, aldehydes, ketones, carboxylic acid groups and their salts, esters and acid halides, epoxides, sulfur, boron alkoxides, isocyanates and various silicon compounds.

These electrophiles may contain appended functional groups as in the case of N,N-dimethyl-p-aminobenzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxyl functional group. By these routes, polymers could be prepared containing grafted sites selected from one or more of the following groups of functionality type carboxylic acid, their salts and esters, ketones, alcohols and alkoxides, amines, amides, thiols, borates, anhydrides, and functional groups containing a silicon atom.

These functionalities can be subsequently reacted with other modifying materials to ultimately produce carboxyl functional groups appended thereon. In some cases, the reaction could take place simultaneously with the grafting process but in most examples it would be practiced in subsequent post modification reaction.

The quantity of molecular units containing carboxyl functional groups in the modified block copolymer is dependent on the content and the aromatic structure of the alkenyl arene therein. Once these parameters are fixed, the number of such groups present is dependent on the degree of functionality desired between a minimum and maximum degree of functionality based on these parameters. This minimum and maximum functionality level corresponds to about an average of one carboxyl functional group per A block and about an average of one carboxyl functional group per cyclic ring of the A block, respectively. It is currently believed that the average of one addition per ring is limiting and that beyond this quantity there are no improvement effects commensurate with the quantity of addition.

Where the alkenyl arene is styrene or a variation thereof, the average figure for the entire modified block copolymer of the present invention is preferably from about 0.06 percent to about 45 percent by weight of the styrene content of the base block copolymer, and more preferably from about 0.5 to about 15.0 percent by weight of the styrene content of the base block copolymer. If the quantity of addition is 0.06 percent of the styrene content which rougly corresponds to about 0.02 parts by weight with respect to 100 parts by weight of the base block copolymer, if the polymer has a polystyrene content of 33%, the resulting composition is substantially identical to the base block copolymer. The quantity of addition corresponding to about 45 percent of the styrene content is approximately equivalent to on the average about one addition per styrene group or ring.

Neutralization of Modified Block Copolymer

The carboxyl functional groups in the modified block copolymers of the present invention may then be "neutralized" by reacting the copolymer with an ionizable metal compound to obtain a metal salt. The reaction mechanism involved in the formation of the ionic A block domains and the exact structure of these ionic clusters within the respective domain is not completely understood at the present time. However, it is believed that the surprising high temperature properties of these ionic copolymer are the result of an ionic attraction between the metal ion and one or more ionized carboxyl functional groups in the A block domains.

This ionic attraction results in a form of crosslinking which occurs in the solid state. However, when molten and subjected to the shear stresses which occur during melt fabrication, the ionic crosslinks with these A block copolymers of the present invention weaken and the polymer exhibits melt fabricatability. Moreover, these ion containing block copolymers are readily soluble in polar solvents and may be processed easily from solution. On cooling of the melt or solvent evaporation, the ionic crosslinks are reformed or strengthened as the modified block copolymer solidifies and again exhibits the properties of a crosslinked material.

The improvement in the high temperature properties and deformation resistance resulting from the neutralization of the ionic A block domains is greatly influenced by the degree of neutralization of the ionic A block domains is of the ionic crosslinks and the nature of the crosslink involved. As earlier noted, an improvement in these properties over that of the unmodified block copolymer occurs when the carboxyl functional groups in the modified block copolymer are in a carboxylic acid form. A further enhancement in properties results as the degree of neutralization increases from 0 percent to 100 percent of total functionality content. Thus, as the degree of carboxyl functionality and metal carboxylate salt content are independently or jointly increased, a greater improvement in the high temperature properties of the modified block copolymer is observed. This phenomena is true so long as the modified block copolymer remains processable from the solution or melt state.

The metal ions which are suitable in forming the neutralized block copolymers of the present invention are positive valent ions of metals, preferably mono-, di- and trivalent ions of metals in Groups IA, IB, IIA, IIB, IIIA, IIIB and VIII, of the Periodic Table of Elements. These metal ions can be used alone or in any mixture thereof. Suitable monovalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$, $La^{+3}$ and $Y^{+3}$. Preferable compounds are hydroxides, oxides, alcoholates, carboxylates, formates, acetates, methoxides, ethoxides, nitrites, carbonates and bicarbonates of the above-referenced metal ions.

The degree of carboxyl functionality and of neutralization may be measured by several techniques. For example, infrared analysis may be employed to determine the overall degree of functionality. Additionally, the titration of a solution of the block copolymer with a strong base may be utilized to determine the degree of functionality and/or the degree of neutralization (metal carboxylate salt content). Neutralization as used herein is based on the percentage of carboxyl ions as compared to the total carboxyl group functionality, i.e., carboxylic acid plus the carboxyl ions.

In general, it was found that the added metal ions react approximately stoichiometrically with the carboxyl functional groups (acid form) in the polymer up to about 80 percent neutralization. Thereafter, excess quantities of the metal compound are necessary to carry the neutralization to completion. However, in some instances, an excess of the neutralizing agent may be desirable.

The block copolymers, as modified, may still be used for any purpose for which an unmodified material (base polymer) was formerly used. That is, they may be used for adhesives and sealants, or compounded and extruded and molded in any convenient manner.

Preparation of the Modified Block Copolymers

The polymers may be prepared by any convenient manner. Preferably, the polymer is prepared as described in copending U.S. application Ser. No. 766,622 (K-4723) which is herein incorporated by reference. Therein, the functional groups are primarily incorporated into the block copolymer primarily on the aromatic portion of the alkenyl arene block via metalation.

Metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the $R'$ is usually a saturated hydrocarbon radical of any length whatsoever, but ordinarily containing up to 20 carbon atoms, and can also be an aromatic radical such as phenyl, napthyl, tolyl, 2-methylnapthyl, etc., or a saturated cyclic hydrocarbon radical of e.g. 5 to 7 carbon atoms, a mono-unsaturated cyclic hydrocarbon radical of 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithio butane, 1,3,5-trilithiopentane, and the like. The lithium alkyls must be more basic than the product metalated alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond, (2) at a carbon to which an aromatic is attached, (3) in an aromatic group, or (4) in more than one of these positions. In the metalation of saturated polymers having aromatic groups as is preferably the case herein, the metalation will occur primarily in an aromatic group and as a minor product at a carbon to which an aromatic is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This chemistry distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to teach nitrogen and include, for example:

(a) Chelating tertiary diamines, preferably those of the formula $R_2N-(CH_2)_y-NR_2$ in which each R can be the same or different straight- or branched-chain alkyl group of any chain length containing up to 20 carbon atoms or more all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, N,N,N,N'N'N'-triethylenediamine, and the like.

Tertiary monoamines such as triethyldiamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lethiation of the hydrogenated copolymer. The solvent/copolymer weight ratio which is convenient generally is is the range of about 5:1 to 20:1. Solvents such as chlorinated hydrocarbon, ketones, and alcohols, should not be used because they destroy the lithiating compound.

Polar metalation promotors may be present in an amount sufficient to enable metalation to occur, e.g. amounts between 0.01 and 100 or more preferably between 0.1 to about 10 equivalents per equivalent of lithium alkyl.

The equivalents of lithium employed for the desired amount of lithiation generally range from such as about 0.001-3.0 per alkenyl aromatic hydrocarbon unit in the copolymer, presently preferably about 0.01-1.0 equivalents per alkenyl aromatic hydrocarbon unit in the copolymer to be modified.

The amount of lithium alkyl employed can be expressed in terms of the lithium alkyl to alkenyl aromatic hydrocarbon molar ratio. This ratio may range from a value of 1 (one lithium alkyl per alkenyl aromatic hydrocarbon unit) to as low as $1 \times 10^{-3}$ (1 lithium alkyl per 1000 alkenyl aromatic hydrocarbon units).

The process of lithiation can be carried out at temperatures in the range of such as about $-70°$ C. to $+150°$ C., presently preferably in the range of about 25° C. to 75° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally the time can range from a few seconds to about 72 hours, presently preferably from about 1 minute to 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species must contain reactive groups capable of undergoing nucleophilic attack by a lithium anion. Such electrophilic species will react to give polymer bound functional groups including but not limited to:

| | | | |
|---|---|---|---|
| $-\overset{O}{\underset{\|}{C}}-O-$ | carboxyl | $C-NR_2$ | Amine |
| $C-OH$ | hydroxyl | $\overset{O}{\underset{\|}{C}}-NR_2$ | Amide |
| $C-OR$ | ether | $C-SH$ | Thiol |
| $-\overset{O}{\underset{\|}{C}}-R$ | ketone | $C-B(OR)_2$ | Borane Containing |
| $-\overset{O}{\underset{\|}{C}}-H$ | aldehyde | $C-Si-$ | Silicon Containing |

If necessary, the process also includes further chemistry on the modified block copolymer to carboxylate same. The resulting carboxyl functional groups may then be easily converted from or to a carboxylic acid form or a neutralized salt form.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal compound in the modified block copolymer. No particular reaction conditions are essential except that the conditions should preferably permit the removal of the neutralization product. More specifically, the neutralization reaction is preferably carried out either (1) by adding the metal compound, directly or in solution, to a solution of the modified block copolymer and then, on neutralization, precipitating and separating the resulting polymer; or (2) by melt blending the block copolymer with the metal compound. The melt blending is preferably conducted at elevated temperatures to facilitate homogeneous distribution of the metal compound and to volatize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably an organic acid such as acetic acid and citric acid. The resulting metal-salt acidification product is not believed to be harmful to the resulting modified block copolymer. However, the metal salt may be removed by conventional means if so desired.

As an additional alternative, the all acid and the all neutralized salt forms of the block copolymer may be blended with each other by either the solution or melt blending method mentioned above, to achieve the desired degree of neutralization. It is to be understood, however, that the specific technique employed is not critical as long as it meets the requirements set forth above. The extent of the neutralization, i.e., the degree to which the metal ion is linked with the carboxylate ion may be readily analyzed by titration methods.

It is not essential that the metal compound be added as such, but it is possible to form the metal compound in situ from components which react with each other in the desired manner in the polymer environment. Thus, it is possible to add a metal oxide to the all acid or partially neutralized block copolymer then add an acid such as acetic acid in the proper proportion and form the metal compound, i.e., the metal acetate, while the polymer is milled. The metal compound then neutralizes the block copolymer to the desired degree depending on the proportion of metal compound formed.

The polymer compositions of the present invention can also contain thermoplastic polymers which are not reactive with the modified block copolymer, and preferably non-polar, such as styrene polymers and olefin polymers, as a separate and preferably dispersed phase therein. These thermoplastic polymers can optionally be incorporated into the present polymer compositions to improve the processability of the composition without substantially detracting from the essential character of the modified block copolymer therein. The amount of the non-reactive thermoplastic polymer is preferably 100 parts by weight or less, more preferably 1 to 50 parts by weight based on 100 parts by weight of the continuous phase, modified block copolymer.

The styrene polymers are polymer substances containing 50% by weight or more of styrene, such as polystyrene, styrene-α-methylstyrene copolymers, butadiene-styrene block copolymers and hydrogenated derivatives thereof, isoprene-styrene block copolymers and hydrogenated derivatives thereof, rubber modified high impact polystyrene, and mixtures thereof.

The olefin polymers are polymer substances containing 50% by weight or more of an olefin monomer unit containing ethylene, propylene, butene and the like. Typical examples of such polymers are low-density polyethylene, high density polyethylene, polypropylene, polybutene, ethylene-propylene copolymers and the like, including mixtures thereof.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

The compositions of the present invention can be molded or formed into various kinds of useful articles by using conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, footwear, medical equipment and accessories, packaging materials, building materials and the like.

To assist those skilled in the art in the practice of this invention, the following Examples are set forth as illustrations. It is to be understood that in the specification and claims herein, unless otherwise indicated, when amounts are expressed in terms of percent by weight, it is meant percent by weight based on the block copolymer.

In the following Examples, film casts from solution of the block copolymer of the present invention were tested using the following test procedures in the dry-as-cast state.

Glass Transition Temperature (Tg): Dynamic mechanical analysis utilizing a Rheovibron Dynamic Viscoelastometer. Furthermore, compression molded plaques of the block copolymer of the present invention were tested using the following test procedures in the dry-as-molded state.

Compression Set: ASTM-D-395, Method B

EXAMPLES

Having thus broadly described the present invention, it is believed that the same will become even more apparent by reference to the following examples. It will be appreciated, however, that the examples are presented solely for the purposes of illustration and should not be construed as limiting the invention. Furthermore, it is to be understood that in the tables that follow where reference is made to "counterion" only the metal counterion will be listed with respect to the partially neutralized modified block copolymers with the hydrogen counterion relating to the remaining acid functionality being implied.

The base (unmodified) block copolymers used were the polystyrene-poly(ethylene/butylene)-polystyrene (S-E/B-S) block copolymers shown in Table 1. The base block copolymers were the products of selectively hydrogenating a polystyrene-polybutadiene-polystyrene (S-B-S) block copolymer effected by use of a catalyst comprising the reaction products of an aluminum alkyl compound with nickel carboxylates. The base block copolymers have a residual ethylenic unsaturation of less than about 2% of the original unsaturation in the polybutadiene block and have a residual aromatic unsaturation of greater than 95% of the original unsaturation in the polystyrene block.

| Base Block Copolymer | Styrene Content (wt. %) | Block Styrene Content (wt. %) | Total Mw. | Polymer Structure $S_1$-E/B-$S_2$ Block Mw |
|---|---|---|---|---|
| A | 30 | 30 | 51,500 | 7,700-36,000-7,700 |

-continued

| Base Block Copolymer | Styrene Content (wt. %) | Block Styrene Content (wt. %) | Total Mw. | Polymer Structure $S_1$-E/B-$S_2$ Block Mw |
|---|---|---|---|---|
| B | 28 | 28 | 70,000 | 10,000-50,000-10,000 |

Remarks:
$S_n$ - Polymer block composed chiefly of styrene.
E/B - Polymer block composed chiefly of ethylene/butylene.
n - Integer representing the order along the molecular chain.
Mw - Weight average molecular weight.

Per the following examples, the base block copolymer was first modified to varying degrees of carboxyl group functionality (content) by grafting carboxyl groups onto the polystyrene blocks via the metalation process described in copending U.S. patent application Ser. No. 766,622, now abandoned. The modified block copolymers were then further modified with lithium, sodium, magnesium and zinc metals to form carboxylate salts at various acid to carboxylate salt contents (degree of neutralization). Films were then cast from a solution of 10%w solids in tetrahydrofuran (THF) for dynamic mechanical analysis and tensile strength measurements. Compression/deformation analysis were performed on molded plaques.

EXAMPLE 1

Modified Block Copolymer

In this experiment, a modified block copolymer "C" was prepared utilizing the base block copolymer "A". A 5% (wt/wt) solution of Polymer A (see Table 1) in cyclohexane (3100 lb) was treated, in a closed vessel under nitrogen, with the metalation promoter, N,N,N',N'-tetramethyldiamine (TMEDA) (14 lb, 55 mol) and a titration indicator, 1,1-diphenylethylene (21g, 0.1 mol). This solution was heated with stirring to 50° C. and titrated with s-butyllithium solution to remove impurities. At the endpoint of the titration, a slight excess s-cutyllithium reagent added to the indicator forming a benzylic anion which gave the solution a yellow/orange color; the persistence of this color was taken as an indication that the solution was now anhydrous and anaerobic. These conditions were maintained throughout the rest of the experiment.

The metalation reagent, s-butyllithium (41 lb of a 12% (wt/wt) solution in cyclohexane, 35 mol), was added to the reaction mixture over a period of 15 minutes. The lithiated polymer cement was quite viscous and yellow in color. An aliquot of the cement was removed and treated with an excess of $D_2O$. This procedure placed a deuterium atom on the polymer at sites which had been lithiated. Analysis of the deuterated polymer using a Deuterium NMR technique found 89% of the deuterium was attached to the aromatic ring. Appropriate control experiments showed that the remainder of the deuterium label was at benzylic centers (about 5%) in the polystyrene segment and at allylic centers (about 6%) in the rubber of the polymer. These results showed that the polymer was lithiated principally in the styrene blocks (at least 94%).

After 1 hour in the lithiation reactor (60° C.), the cement was transferred to a closed vessel containing carbonated (142 lb of $CO_2$, 1500 mol) tetrahydrofuran (THF) (about 380 gal). The lithiated polymer cement was introduced below the surface of the $CO_2$/THF mixture. While carboxylation was likely instantaneous, the mixture was stirred at room temperature for 4 hr. The reactor product was acidified by the addition of 26 lbs. of acetic acid (200 mol). Modified block copolymer C was recovered by steam coagulation and dried at 50-60° C. in a vacuum oven. Over 150 lb. of white, carboxylated block copolymer crumb, Polymer C, was recovered.

To measure the polymer bound carboxyl acid (—COOH) content of Polymer C, an aliquot of the finished polymer was dissolved in THF and titrated to a phenolphthalein endpoint using 0.01N KOH in methanol. The titration found 1.15%wt —COOH.

To determine the total carboxylate content, both —COO$^-$ and —COOH moieties of Polymer C, an aliquot of the finished polymer was dissolved in cyclohexane at a 10% solids level and treated with an equal volume of acetic acid. Control experiments had shown that the acid treatment converted polymer bound —COO$^-$ to —COOH species. The acidified mixture was repeatedly washed with $H_2O$ until the wash sample was neutral to remove excess acetic acid and acetate salts. The fully acidified polymer was precipitated in isopropanol, dried and titrated as outlined above. The titration found 1.15%wt —COOH; the same result as had been observed for the as finished polymer. By difference, we concluded that the as finished product, Polymer C, contained no carboxylate salt; Polymer C was in the all acid form —COOH.

An infrared analysis based upon characteristic IR bands for the —COOH species (1690 cm$^{-1}$) and polystyrene (1590 cm$^{-1}$) (in essence an internal standard signal) corroborated the titration results. The IR data were from a solution cast film of Polymer C.

Polymers D and L (see Table 2) were prepared using a modification of the procedure described for the preparation of Polymer C. Polymers D and L were prepared on a 5 lb scale. Polymer L used Polymer B as a starting material. These preparations employed an increased amount of the metalation reagent (promoter) relative to the amount of polymer substrate. This led to products having higher carboxylate contents.

TABLE 2

| Modified Block Copolymer | Base Block Copolymer | Carboxyl functionality (% w-COOH) |
|---|---|---|
| C | A | 1.15 |
| D | A | 3.15 |
| L | B | 2.76 |

EXAMPLE 2

Neutralized Modified Block Copolymers

In this example, modified block copolymers were neutralized utilizing monovalent metal counterions, such as sodium (Na$^{1+}$) and lithium (Li$^{1+}$), and divalent metal counterions, such as magnesium (Mg$^{2+}$) and zinc (Zn$^{2+}$). The neutralized modified block copolymers were obtained by adding aqueous sodium hydroxide, lithium hydroxide and zinc acetate solutions to the modified block copolymer (all acid) in THF, respectively. The modified block copolymers neutralized utilizing magnesium metal counterions were obtained by neutralizing the respective modified block copolymer (all acid) in toluene with magnesium methoxide in anhydrous methanol. For those neutralized modified block copolymers having a metal carboxylate salt content greater than 80% based on total carboxyl groups, an excess of the metal carrying compound was utilized (typically five times stoichiometric) to ensure the high degree of neutralization.

Table 3 indicates the various neutralized block copolymers produced from the corresponding modified block copolymers for purposes of the following examples.

TABLE 3

| Modified Block Copolymer | Carboxyl functionality (% w) | Counterion | % Carboxyl Groups Neutralized |
|---|---|---|---|
| C | 1.15 | H | 0 |
| F1 | 1.15 | Na | 92 |
| G1 | 1.15 | Mg | 97 |
| H1 | 1.15 | Li | 45 |
| H2 | 1.15 | Li | 80 |
| H3 | 1.15 | Li | 95 |
| H4 | 1.15 | Li | 50 |
| J1 | 1.15 | Zn | >90 |
| D | 3.2 | H | 0 |
| K1 | 3.2 | Li | 67 |
| K2 | 3.2 | Li | >90 |
| L | 2.76 | H | 0 |
| M1 | 2.76 | Li | 65 |

EXAMPLE 3

Effect of Degree of Neutralization on Polystyrene Tg

In this example, the glass transition temperatures (Tg) of the polystyrene and poly(ethylene/butylene) phases of solution cast films of the base block copolymer "A" (control), and the carboxylated block copolymer having 1.15%w carboxyl functionality and a ratio of acid to lithium carboxylate salt of 100:0 (C), 55:45 (H1), and 5:95 (H3) were measured.

As is readily apparent from Table 4, carboxylation of the base block copolymer significantly increases the Tg of the polystyrene phase (S) without affecting the Tg of the poly(ethylene/butylene) phase (E/B). Furthermore, as the degree of neutralization (carboxylate salt content) is increased, there is a corresponding increase in the Tg of the polystyrene phase. The increase in the Tg of the polystyrene phase is attributed to the existence of ion pair associations (ionic crosslinking). Incorporating a metal counterion increases the strength of these ion pair associations, further hindering molecular motion within the polystyrene phase.

TABLE 4

| Sample | Counterion | Tg, E/B °C. | Tg, S °C. |
|---|---|---|---|
| Control | — | −42 | 97 |
| C | H | −42 | 120 |
| H1 | Li | −42 | 129 |
| H3 | Li | −42 | 135 |

EXAMPLE 4

Effect of Degree of Functionality on Polystyrene Tg

In this example, the glass transition temperatures (Tg) of the polystyrene and poly(ethylene/butylene) phases of additional solution cast films were measured. These films were of the base block copolymer "A" (control), and the carboxylated block copolymers having carboxyl functionality of 1.15%w (C) and 3.15%w (D), plus their lithium carboxylate salt counterparts (H3 and K2, respectively).

As is readily apparent from Table 5, the Tg of the polystyrene phase is enhanced by increasing the level of carboxyl functionality (see C and F). As earlier noted, the Tg of the polystyrene phase is also increased by increasing the metal carboxylate salt content at a fixed carboxyl functionality level. Table 5 also verifies the latter effect with respect to differing levels of carboxyl functionality (see C versus H3 and F versus K2). Thus, the effects of the level of carboxyl functionality and the metal carboxylate salt content compliment each other in correspondingly enhancing the Tg of the polystyrene as either or both of these quantities are increased. In the all acid form (—COOH), the ion pair interactions involving the hydrogen counterions with the polystyrene (alkenyl arene) phase are favored as the number of carboxyl functional groups is increased, thereby hindering chain mobility. As the hydrogen counterions are replaced with metal counterions via neutralization of the carboxylic acid moieties, the ion pair associations are promoted to a greater degree resulting in a corresponding enhancement in the Tg of the polystyrene phase.

TABLE 5

| Sample | Carboxyl Functionality (% w) | Counterion | % Carboxyl Groups Neutralized | Polystyrene Tg (°C.) |
|---|---|---|---|---|
| A (control) | — | — | — | 102 |
| C | 1.15 | H | 0 | 125 |
| H3 | 1.15 | Li | 95 | 145 |
| F | 3.25 | H | 0 | 160 |
| K2 | 3.25 | Li | >90 | >250 |

EXAMPLE 5

Effect of Counterion on Polystyrene Tg

In this example, the glass transition temperatures (Tg) of the polystyrene phase of films cast from either THF or toluene or mlet pressed films of the base block copolymer "A" (control), and the carboxylated block copolymer with 1.15%w carboxyl functionality having the counterions $H^{1+}$ (C), $Na^{1+}$ (F1), $Mg^{2+}$ (G1), $Li^{1+}$ (H3), and $Zn^{2+}$ (J1) were measured.

As earlier noted (Example 3) and as is also apparent in Tables 4 and 6, carboxylation of the base block copolymer significantly increases the Tg of the polystyrene blocks (S) without affecting the Tg of the poly(ethylene/butylene) block (E/B). Furthermore, the Tg of the S block may be further increased by the neutralization of the all acid carboxylated block copolymer (C) with various metal counterions.

TABLE 6

| | | | Tg, Polystyrene Block (°C.) | | |
| Sample | Counterion | % Carboxyl Groups Neutralized | Toluene Cast | THF Cast | Melt Pressed |
|---|---|---|---|---|---|
| A (Control) | — | — | 100 | 100 | 102 |
| C | H | 0 | 120 | 120 | 125 |
| F1 | Na | 92 | — | 140 | 140 |
| G1 | Mg | 97 | 125 | — | 135 |
| H3 | Li | 95 | 135 | 140 | 145 |

TABLE 6-continued

| Sample | Counterion | % Carboxyl Groups Neutralized | Tg, Polystyrene Block (°C.) | | |
|---|---|---|---|---|---|
| | | | Toluene Cast | THF Cast | Melt Pressed |
| J1 | Zn | >90 | — | 142 | 142 |

EXAMPLE 6

Effect of Degree of Neutralization on High Temperature Tensile Strengths

In this example, the tensile strengths of solution cast films of the base block copolymer "A" (control), and the carboxylated block copolymer having a ratio of acid to lithium carboxylate salt at 100:0 (C), 55:45 (H1), and 5:95 (H3) were measured at various temperatures.

As is readily apparent from Table 7, carboxylation of the base block copolymer significantly increases the high temperature tensile strength of the material. Furthermore, these high temperature properties are further enhanced as the degree of neutralization (metal carboxylate salt content) is increased. Thus, by varying the degree of neutralization, the modified block copolymer may be tailored to the desired task.

These results demonstrate the necessity of promoting ion pair associations in the alkenyl arene domains to enhance the mechanical performance of these block copolymers at elevated temperatures. Furthermore, the resulting restriction of molecular mobility in the alkenyl arene (polystyrene) domains correlates to tensile strength enhancement at elevated temperatures as evidence by changes in the Tg of the polystyrene phase with respect to the presence of ion pair associations.

TABLE 7

| Temp (°C.) | Tensile Strengths, (psi) | | | |
|---|---|---|---|---|
| | A (Control) | C | H1 | H3 |
| Room Temp | 5300 | 5800 | 5800 | 5900 |
| 70 | 210 | 1300 | 2500 | 3400 |
| 100 | 50 | 205 | 800 | 1200 |
| 150 | — | 30 | 80 | 250 |
| 200 | — | — | 15 | 70 |

EXAMPLE 7

Effect of Counterion on High Temperature Tensile Strength

In this example, the tensile strengths of solution cast films of the base block copolymer "A" (control) and the modified block copolymer with 1.15%w carboxyl functionality (content) having the counterions $H^{1+}$ (C), $Na^{1+}$ (F1), $Li^{1+}$ (H3), and $Zn^{2+}$ (J1) were measured at various temperatures.

Table 8 depicts the effect of different counterions on the tensile strength of the respective material as a function of temperature. The metal carboxylate salts possess superior high temperature properties over those of the all acid material and base block copolymer. Again, the opportunity presents itself with respect to tailoring the copolymer to the desired application by specifying a particular counterion and/or combination of counterions.

TABLE 8

| Sample | Counterion | % Carboxyl Groups Neutralized | Tensile Strengths, (psi) | | | | |
|---|---|---|---|---|---|---|---|
| | | | R.T. | 70° C. | 100° C. | 150° C. | 200° C. |
| A (Control) | — | — | 5300 | 210 | 48 | — | — |
| C | H | 0 | 5800 | 1300 | 50 | 30 | — |
| F1 | Na | 92 | 6800 | — | 1700 | 300 | 60 |
| H3 | Li | 95 | 5900 | 3400 | 1200 | 250 | 70 |
| J1 | Zn | >90 | 5700 | 3200 | 1400 | 400 | 70 |

EXAMPLE 8

Effect of Degree of Functionality and Neutralization on High Temperature Tensile Strengths In this example, the tensile strengths of solution cast films of the base block copolymer "A" (control), modified block copolymers having 1.15%w carboxyl functionality with a ratio of acid to lithium carboxylate salt at 100:0 (C) and 5:95 (H3) and modified block copolymers having 3.15%w carboxyl functionality with a ratio of acid to lithium carboxylate salt at 100:0 (D) and 33:67 (K1) were measured at various temperatures.

As is evident from Table 9, increasing the degree of carboxyl functionality results in a dramatic improvement in the tensile strength of the modified block copolymer at 100° C. Thus, by incorporating more ionic crosslinking species in the alkenyl arene segment, the mechanical integrity of the individual alkenyl arene domain is enhanced which translates into improved tensile properties at elevated temperatures. These results are consistent with the belief that selective functionalization of the alkenyl arene blocks with carboxyl functional groups promotes improved performance not previously achieved with other modified block copolymers.

As noted in Examples 6 and 7, the tensile strength of the modified block copolymer is also enhanced by increasing the metal carboxylate salt content at a fixed carboxyl functionality level. Table 9, also verifies this effect with respect to differing levels of carboxyl functionality (see C versus H3 and F versus K1 (67% neutralization)). Thus the effects of the level of carboxyl functionality and the metal carboxylate salt content (neutralization level) compliment each other in correspondingly enhancing the tensile strength of the modified block copolymer at elevated temperatures as either or both of these quantities are increased. Furthermore, these results correlate well with the corresponding enhancement of the Tg of the polystyrene phase shown in Example 4.

TABLE 9

| Sample | Counterion | Carboxyl Functionality (% w) | % Carboxyl Groups Neutralized | Tensile Strength (psi) Room Temp. | 100° C. |
| --- | --- | --- | --- | --- | --- |
| A (Control) | — | — | — | 5300 | 50 |
| C | H | 1.15 | 0 | 5800 | 205 |
| H3 | Li | 1.15 | 95 | 5900 | 1200 |
| F | H | 3.15 | 0 | 5600 | 1050 |
| K1 | Li | 3.15 | 67 | 5450 | 1200 |

EXAMPLE 9

Retention of Small Strain Deformation with Increasing Salt Content (Degree of Neutralization)

In this example, dynamic mechanical analysis was performed on dumbell shaped samples using a Rheovibron DDV-II-C Autovibron Dynamic Viscoelastometer. The samples were prepared from solution cast films of the base block copolymer "A" (control) and the modified block copolymer having carboxyl functionality of 1.15%w with the counterions $H^{1+}$ (C), $Na^{1+}$ (F1), $Li^{1+}$ (H3) and $Zn^{2+}$ (J1).

FIG. 1 graphically compares the dynamic tensile modulus, E, as a function of temperature for the above-referenced samples. As is visually evident from FIG. 1, the mechanical integrity as detected by the magnitude of the dynamic tensile modulus of the modified block copolymers containing the various metal carboxylate salts determined at low strains persists to higher temperature when compared with the control. This behavior reflects the improvements achieved when ion pair associations are present in the alkenyl arene block of the block copolymer thereby increasing the Tg of the alkenyl arene phase.

EXAMPLE 10

Effect of Degree of Functionality and Neutralization on Compression Set

In this example, the degree of compression set of molded plaques of the base block copolymers "A" (control) and "B" (control) and various modified block copolymers derived therefrom were measured. The modified block copolymers utilized were the carboxylated (modified) block copolymer having 1.15%w carboxyl functionality with a ratio of acid to lithium carboxylate salt of 100:0 (C) and 20:80 (H2), and the carboxylated block copolymer having 2.67%w carboxyl functionality with a ratio of acid to lithium carboxylate salt of 35:65 (M1).

Table 10 summarizes the effect of the degree of carboxyl functionality and neutralization on the compression set of these modified block copolymers both at room temperature (R.T.) and elevated temperatures. The reported compression set values are the percent of unrecovered strain resulting from first subjecting the respective sample to an initial compressive strain of 25%; i.e., the sample is compressed to 75% of its initial height, for 22 hours at the indicated temperature and thereafter allowing a recovery period of 30 minutes during which the sample is not subjected to any strain.

As is readily apparent from Table 10, a distinct decrease in the unrecoverable strain (deformation) results with the addition of carboxyl functionality (see A versus H1). This result is most apparent at 70° C. and 100° C. This behavior is further enhanced when the polymer is neutralized with a metal conterion, for example lithium (see A and H1 versus H2). Moreover, increasing the degree of carboxyl functionality along with neutralization in the modified block copolymer drastically reduces the amount of permanent compressive deformation observed in the material at elevated temperatures (see L1).

These results suggest that ion pair associations in the polystyrene phase (alkenyl arene domains) contribute to increasing the resistance of the modified block copolymer to permanent deformation.

TABLE 10

| Sample | Carboxyl Functionality (% w) | Counterion | % Carboxyl Groups Neutralized | % Compression Set R.T. | 70° C. | 100° C. |
| --- | --- | --- | --- | --- | --- | --- |
| A (Control) | — | — | — | 20 | 95 | 100 |
| H1 | 1.15 | H | 0 | 35 | 65 | 85 |
| H2 | 1.15 | Li | 80 | 25 | 50 | 60 |
| B (Control) | — | — | — | 30 | 20 | 95 |
| M1 | 2.76 | Li | 65 | 25 | 30 | 20 |

EXAMPLE 11

Effect of Incorporating Non-reactive Thermoplastic Polymers on High Temperature Tensile Strengths In this example, the tensile strengths of injection molded samples of a composition having a block copolymer and 20 parts by weight of a non-reactive thermoplastic polymer based on 100 parts by weight of the respective block copolymer were measured at various temperatures. The non-reactive thermoplastic polymer used was polypropylene. The block copolymers utilized were the base block copolymer "A" (control), and the carboxylated block copolymer having 1.15wt. % carboxyl functionality with a ratio of acid to lithium carboxylate salt at 100:0 (C) and 50:50 (H4).

As is readily apparent from Table 11, carboxylation of the base block copolymer significantly increases the high temperature tensile strength of these binary block polymer/polypropylene blends. Furthermore, these high temperature properties are further enhanced as the degree of neutralization (metal carboxylate salt content) is increased. Thus, by varying the degree of neutralization, the modified block copolymer blend composition may be tailored to the desired task.

These trends correlate well with those observed in the neat polymer composition in Example 6 herein. Thus, these results also demonstrate the necessity of promoting ion pair associations in the alkenyl arene domains to enhance the mechanical performance of these block copolymer compositions at elevated temperatures. Furthermore, the resulting restriction of molecular mobility in the alkenyl arene (polystyrene) domains correlates to tensile strength enhancement at elevated temperatures as evidenced by changes in the Tg of the polystyrene phase with respect to the presence of ion pair associations.

TABLE 11

| Sample[1] | Counterion | Carboxyl Functionality (% w) | % Carboxyl Groups Neutralized | Tensile Strength (psi) | | |
|---|---|---|---|---|---|---|
| | | | | R.T.[2] | 70° C. | 100° C. |
| A (Control) | — | — | — | 5300 | 580 | 305 |
| C | H | 1.15 | 0 | 4500 | 740 | 400 |
| H4 | Li | 1.15 | 50 | 3000 | 910 | 475 |

[1]Formulation:
100 parts by weight block copolymer indicated
20 parts by weight polypropylene
[2]Room Temperature While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A functionalized, selectively hydrogenated block copolymer to which has been grafted a carboxyl functional group, said copolymer comprising:
   (a) at least two alkenyl arene polymer blocks A and
   (b) at least one substantially completely, hydrogenated conjugated diene polymer block B,
   (c) wherein said B block is between said two A blocks,
   (d) wherein substantially all of said carboxyl functional groups are grafted to said copolymer on said A blocks, and
   (e) wherein 0 percent to 100 percent of said carboxyl functional groups are ionized by neutralization with metal ions having a positive ionized valence, said metal ions being selected from the group consisting of uncomplexed and complexed metal ions.

2. The copolymer according to claim 1, wherein said copolymer has a linear structure.

3. The copolymer according to claim 1, wherein said copolymer has a branched structure.

4. The copolymer according to claim 1, wherein the grafted carboxyl functional groups are present on the average in an amount from
   (a) about one of said carboxyl functional groups per said A block to
   (b) about one of said carboxyl functional group per aromatic ring of said A block.

5. The copolymer according to claim 1, wherein said metal ion is selected from the group consisting of monovalent metal ions, divalent metal ions, trivalent metal ions and combinations thereof.

6. The copolymer according to claim 1, wherein said metal ion is selected from the group consisting of lithium ions, sodium ions, magnesium ions, zinc ions, and combinations thereof.

7. The copolymer according to claim 1, wherein at least about 10 percent of said carboxyl functional groups are ionized by neutralization with said metal ions.

8. The copolymer according to claim 1, wherein at least about 90 percent of said carboxyl functional groups are ionized by neutralization with said metal ions.

9. The copolymer according to claim 2, wherein
   (a) each of said A blocks prior to hydrogenation is predominatly a polymerized monoalkenyl monocyclic arene block having an average molecular weight of about 1,000 to about 125,000,
   (b) each of said B blocks prior to hydrogenation is predominantly a polymerized conjugated diene block having an average molecular weight of about 10,000 to about 450,000,
   (c) said A blocks constituting about 1 to about 99 percent by weight of said copolymer,
   (d) the residual ethylenic unsaturation of said B block, is less than about 10 percent of the ethylenic unsaturation of said B blocks prior to hydrogenation, and
   (e) the residual aromatic unsaturation of said A blocks is greater than about 50 percent of the aromatic unsaturation of said A block, prior to hydrogenation.

10. The copolymer according to claim 9, wherein said grafted carboxyl functional groups are present in an amount from about 0.06 percent to about 45.0 percent by weight of the monocyclic arene content of said copolymer prior to functionalization.

11. The copolymer according to claim 9, wherein said grafted carboxyl functional groups are present in an amount from about 0.5 percent to about 15.0 percent by weight of the monocyclic arene content of said copolymer prior to functionalization.

12. The copolymer according to claim 2, wherein prior to hydrogenation:
   (a) said A block is polymerized styrene and
   (b) said B block is selected from the group consisting of polymerized isoprene, polymerized butadiene, and polymerized isoprene and butadiene copolymer.

13. The copolymer according to claim 12, wherein said B block is polymerized butadiene block having a 1,2 content of between about 35 percent and about 55 percent.

14. The copolymer according to claim 11, wherein said polymerized conjugated diene block has an average molecular weight of between about 10,000 to about 150,000.

15. The copolymer according to claim 14, wherein the residual ethylenic unsaturation of said polymerized conjugated diene block is less than 5 percent of the ethylenic unsaturation present prior to hydrogenation.

16. The copolymer according to claim 15, wherein the residual ethylenic unsaturation of said polymerized conjugated diene block is at most 2 percent of the ethylenic unsaturation present prior to hydrogenation.

17. The copolymer according to claim 12, wherein said polymerized styrene block has an average molecular weight of between about 1,000 and about 60,000.

18. The copolymer according to claim 2, wherein prior to functionalization said copolymer is a polystyrene-poly(ethylene/butylene)-polystyrene block copolymer.

19. The copolymer according to claim 1, wherein on the average the aromatic unsaturation of said A blocks is greater than about 90 percent of the aromatic unsaturation of said A block prior to hydrogenation.

20. The copolymer according to claim 1, wherein on the average the residual ethylenic unsaturation of said B blocks is less than about 5 percent of the ethylenic unsaturation of said B blocks prior to hydrogenation.

21. The copolymer according to claim 20, wherein on the average the residual ethylenic unsaturation of said B blocks is at most about 2 percent of the ethylenic unsaturation of said B blocks prior to hydrogenation.

22. An article of manufacture, possessing excellent mechanical properties and deformation resistance especially at elevated temperatures, consisting essentially of:
   (1) a functionalized, selectively hydrogenated block copolymer to which has been grafted a carboxyl functional group, said copolymer comprising
      (a) at least two alkenyl arene polymer blocks A and
      (b) at least one substantially completely, hydrogenated conjugated diene polymer block B,
      (c) wherein said B block is between said two A blocks,
      (d) wherein substantially all of said carboxyl functional groups are grafted to said copolymer on said A blocks, and
      (e) wherein 0 percent to 100 percent of said carboxyl functional groups are ionized by neutralization with metal ions having a positive ionized valence, said metal ions being selected from the group consisting of uncomplexed and complexed metal ions; and
   (2) from 0 to about 100 parts by weight of a non-reactive thermoplastic polymer based on 100 parts by weight of said functionalized block copolymer, said thermoplastic polymer selected from the group consisting of styrene polymers, polyolefin polymers and mixtures thereof.

23. The article of manufacture according to claim 22, wherein said copolymer has a linear structure.

24. The article of manufacture according to claim 22, wherein said copolymer has a branched structure.

25. The article of manufacture according to claim 22, wherein the grafted carboxyl functional groups are present on the average in an amount from
   (a) about one of said carboxyl functional groups per said A block to
   (b) about one of said carboxyl functional group per aromatic ring of said A block.

26. The article of manufacture according to claim 22, wherein said metal ion is selected from the group consisting of monovalent metal ions, divalent metal ions, trivalent metal ions and combinations thereof.

27. The article of manufacture according to claim 22, wherein said metal ion is selected from the group consisting of lithium ions, sodium ions, magnesium ions, zinc ions, and combinations thereof.

28. The article of manufacture according to claim 22, wherein at least about 10 percent of said carboxyl functional groups are ionized by neutralization with said metal ions.

29. The article of manufacture according to claim 22, wherein at least about 80 percent of said carboxyl functional group are ionized by neutralization with said metal ions.

30. The article of manufacture according to claim 23, wherein
   (a) each of said A blocks prior to hydrogenation is predominatly a polymerized monoalkenyl monocyclic arene block having an average molecular weight of about 1,000 to about 125,000,
   (b) each of said B blocks prior to hydrogenation is predominantly a polymerized conjugated diene block having an average molecular weight of about 10,000 to about 450,000,
   (c) said A blocks constituting about 1 to about 99 percent by weight of said copolymer,
   (d) the residual ethylenic unsaturation of said B block, is less than about 10 percent of the ethylenic unsaturation of said B blocks prior to hydrogenation, and
   (e) the residual aromatic unsaturation of said A blocks is greater than about 50 percent of the aromatic unsaturation of said A block, prior to hydrogenation.

31. The article of manufacture according to claim 30, wherein said grafted carboxyl functional groups are present in an amount from about 0.06 percent to about 45.0 percent by weight of the monocyclic arene content of said copolymer prior to functionalization.

32. The article of manufacture according to claim 30, wherein said grafted carboxyl functional groups are present in an amount from about 0.5 percent to about 15.0 percent by weight of the monocyclic arene content of said copolymer prior to hydrogenation and functionalization.

33. The article of manufacture according to claim 23, wherein prior to hydrogenation:
   (a) said A block is polymerized styrene and
   (b) said B block is selected from the group consisting of polymerized isoprene, polymerized butadiene, and polymerized isoprene and butadiene copolymer.

34. The article of manufacture according to claim 33, wherein said B block is polymerized butadiene block having a 1,2 content of between about 35 percent and about 55 percent.

35. The article of manufacture according to claim 32, wherein said polymerized conjugated diene block has an average molecular weight of between about 10,000 to about 150,000.

36. The article of manufacture according to claim 35, wherein the residual ethylenic unsaturation of said polymerized conjugated diene block is less than 5 percent of the ethylenic unsaturation present prior to hydrogenation.

37. The article of manufacture according to claim 36, wherein the residual ethylonic unsaturation of said polymerized conjugated diene block is at most 2 percent of the ethylenic unsaturation present prior to hydrogenation.

38. The article of manufacture according to claim 33, wherein said polymerized styrene block has an average molecular weight of between about 1,000 and about 60,000.

39. The article of manufacture according to claim 23, wherein prior to functionalization said copolymer is a polystyrene-poly(ethylene/butylene)-polystyrene block copolymer.

40. The article of manufacture according to claim 22, wherein on the average the aromatic unsaturation of said A blocks is greater than about 90 percent of the aromatic unsaturation of said A block prior to hydrogenation.

41. The article of manufacture according to claim 22, wherein on the average the residual ethylenic unsaturation of said B blocks is less than about 5 percent of the ethylenic unsaturation of said B blocks prior to hydrogenation.

42. The article of manufacture according to claim 41, wherein on the average the residual ethylenic unsaturation of said B blocks is at most about 2 percent of the ethylenic unsaturation of said B blocks prior to hydrogenation.

* * * * *